Figure 1:
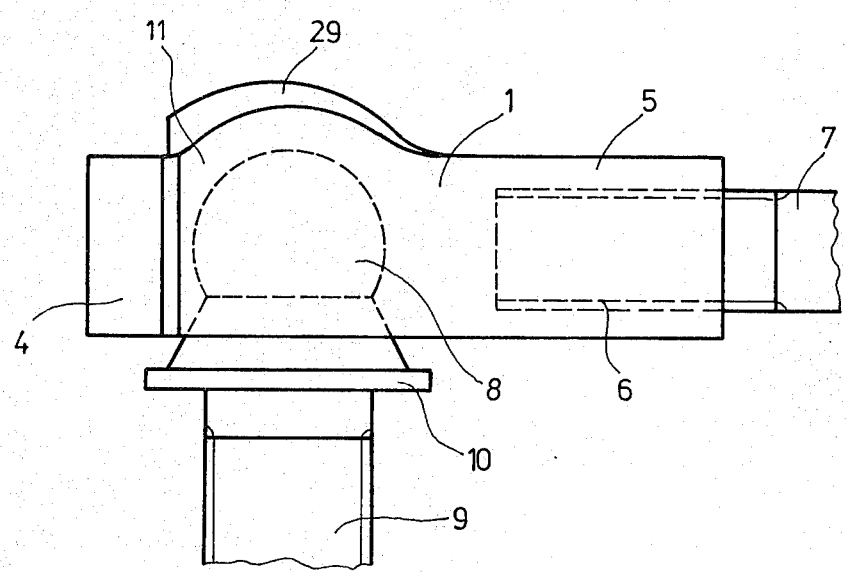

United States Patent [19]

Dieckmann

[11] Patent Number: 4,465,393
[45] Date of Patent: Aug. 14, 1984

[54] PLASTIC BALL SOCKET EXTRUDED IN ONE PIECE FOR A BALL-AND-SOCKET JOINT

[75] Inventor: Klaus Dieckmann, Göppingen-Schopflenberg, Fed. Rep. of Germany

[73] Assignee: Springfix-Befestigungstechnik GmbH, Salach, Fed. Rep. of Germany

[21] Appl. No.: 295,991

[22] Filed: Aug. 25, 1981

[30] Foreign Application Priority Data

Sep. 10, 1980 [DE] Fed. Rep. of Germany ....... 3034080
May 13, 1981 [DE] Fed. Rep. of Germany ....... 3119061

[51] Int. Cl.$^3$ ............................................. F16C 11/06
[52] U.S. Cl. ........................................ 403/76; 403/77; 403/141; 403/142
[58] Field of Search ............... 403/141, 142, 143, 122, 403/71, 76, 77, 315; 220/337, 339; 215/216; 16/225, 374

[56] References Cited

U.S. PATENT DOCUMENTS 3,871,550  3/1975  Chiappe .............................. 220/339
3,900,550  8/1975  Oliver et al. ..................... 220/339 X
4,163,496  8/1979  Dogliotti ......................... 220/339 X

FOREIGN PATENT DOCUMENTS 1294965  11/1972  United Kingdom ................ 403/142

Primary Examiner—Cornelius J. Husar
Assistant Examiner—Joseph A. Fischetti
Attorney, Agent, or Firm—Anthony A. O'Brien

[57] ABSTRACT

A plastic ball socket extruded in one piece for a ball-and-socket joint having a shaft 5 and a ball end 8, the axis of the joint in standard position being lateral to shaft 5. The ball socket is divided by slot 13 extending into the area of its shaft 5. A cover-shaped locking part 4 to hold legs 11, 12 of ball socket 1 together is provided in the region of the open end of slot 13, consisting of two side sections 18, 19 and yoke part 20 connecting the two side sections 18 and 19 with each other. The one side section 18 has a projection 17 fitting over lip 16 arranged on the one leg 12 when locking part 4 holds the two legs 11, 12 together. The free end of the other side section 19 is connected with the other leg 11 via an elastic area forming a hinge strip 26. Within the region of the hinge strip 26, that side pointing away from slot 13 is provided with a recess 21 opening towards the outside, its edges 24, 25 leading outward and being a distance away from each other forming stops that limit the aperture angle of locking part 4, starting from that position in which locking part 4 holds the two leg end portions 14, 15 together.

10 Claims, 8 Drawing Figures

PLASTIC BALL SOCKET EXTRUDED IN ONE PIECE FOR A BALL-AND-SOCKET JOINT

The present invention concerns a ball socket of plastic extruded in one piece for a ball-and-socket joint.

A novel ball socket of this type has been described, for example, in DE-PS No. 1,921,769. To hold the leg end portions of the joint together, such legs extending from the round part of the ball socket and separated from the socket by means of a slot, this known specific embodiment employs a locking part, respectively hinged cover, integrally connected on its one side to one of the legs via a thin strip of the extruded material that acts as a hinge. The other side of said locking part has a projection that engages a lip provided on the other leg, when the locking part holds both legs together.

The disadvantage of this prior art ball socket is that the locking part can readily become detached from the ball socket upon incorrect or frequent handling, due to material fatigue or breakage in the region of the hinge strip.

The problem to be solved by the present invention resides in providing a ball socket for the ball-and-socket joint that obviates breaking off of the locking part from the leg end portion and that can also be subjected to strains greater than customary for known ball sockets.

The solution to this problem is provided by the ball socket construction of the present invention.

An essential advantage of the invention resides in providing a locking part that is considerably stiffer than the one of the known arrangement described, as a result of the construction of the hinge strip.

A further advantage of the present invention resides in making it possible for the complete ball socket to be extruded in one piece together with the locking part.

It is an advantage that the locking part can be released from the leg end portions of the ball socket in a simple manner by pushing the projection gripping the lip of the one leg end portion back with a screwdriver, thereby causing the locking part to become disengaged.

Figure 2:
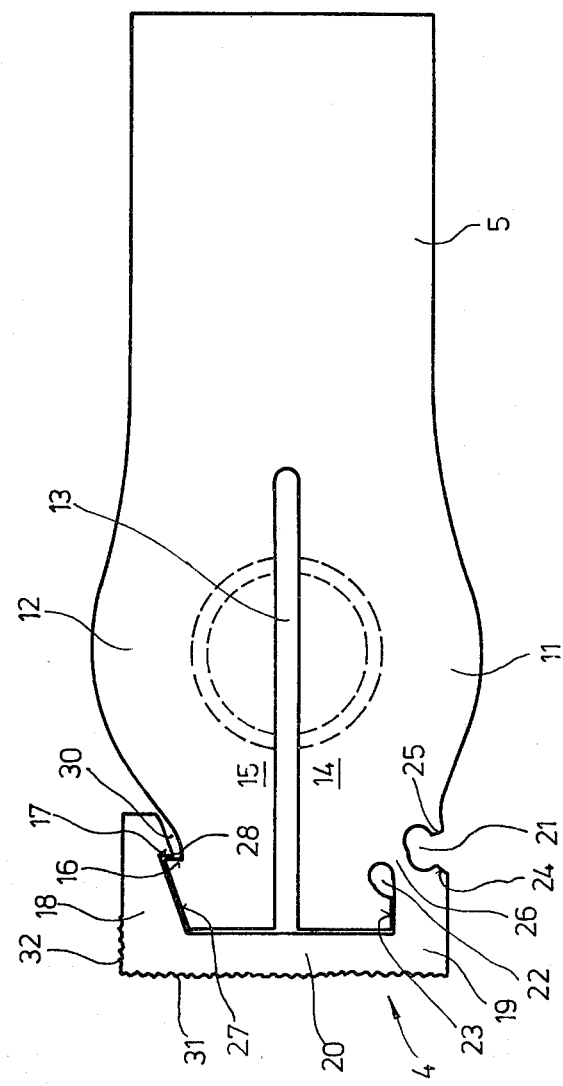
Figure 3:
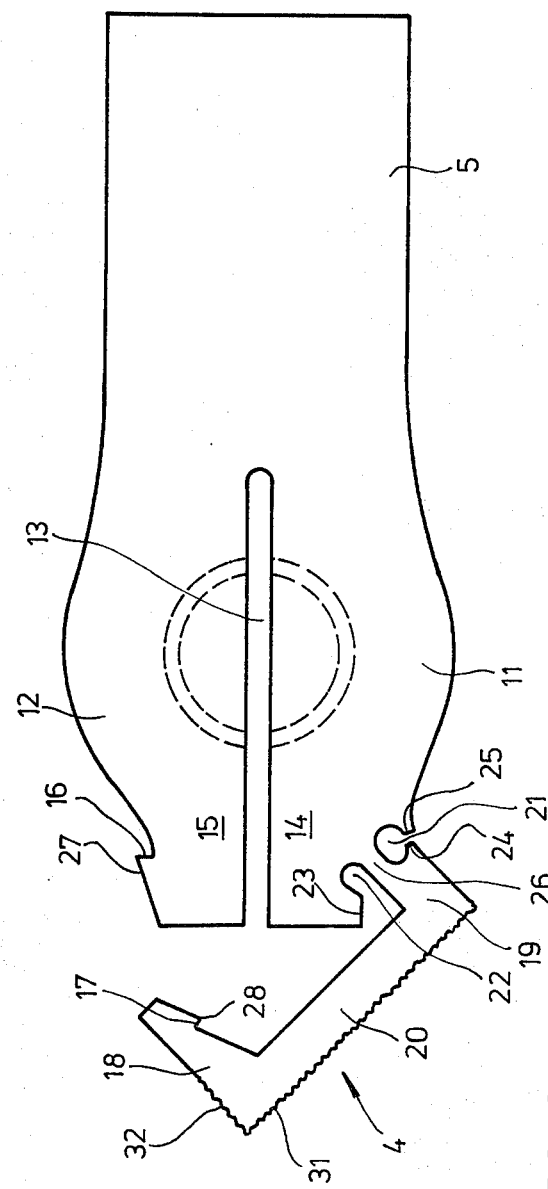
Figure 4:
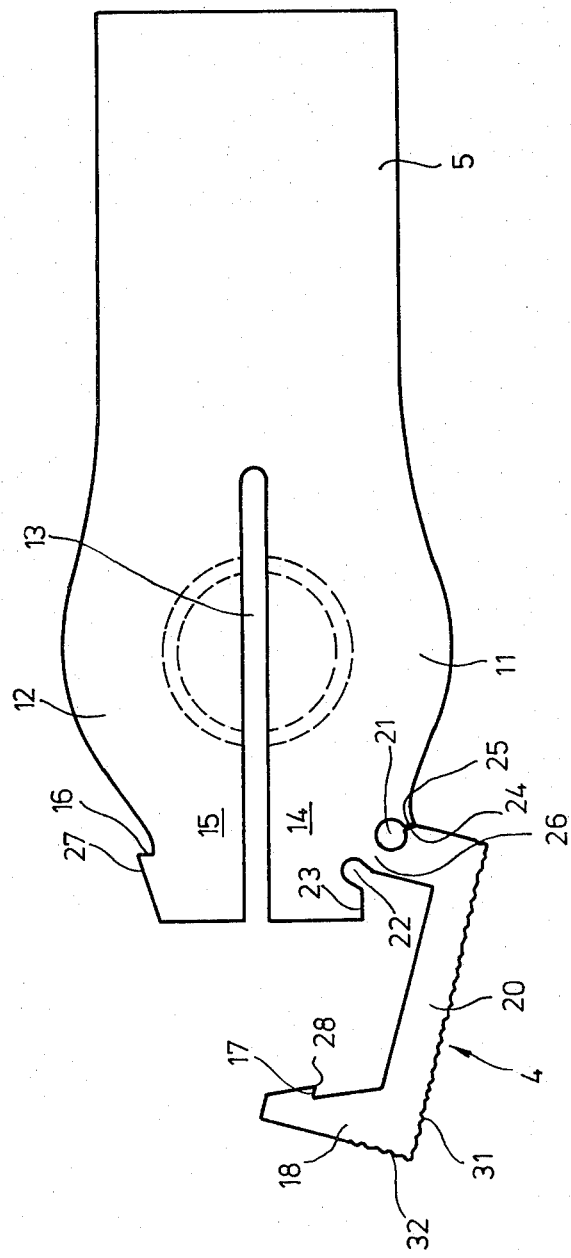
Figure 5:
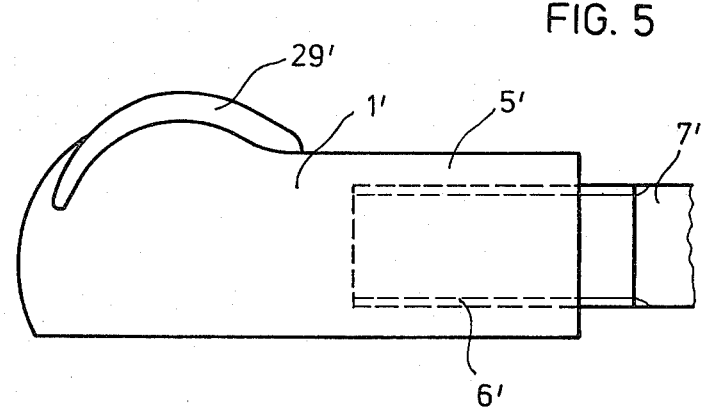
Figure 6:
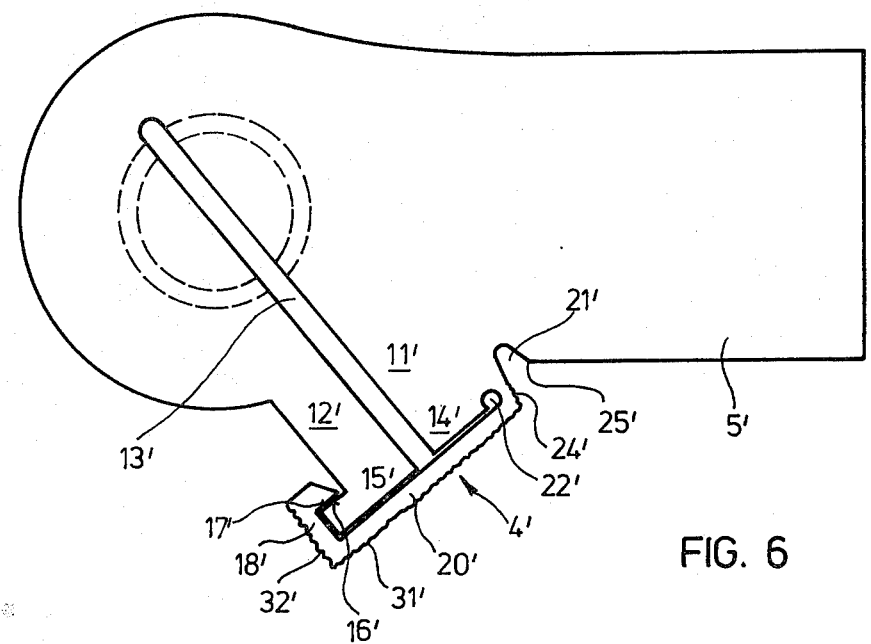
Figure 7:
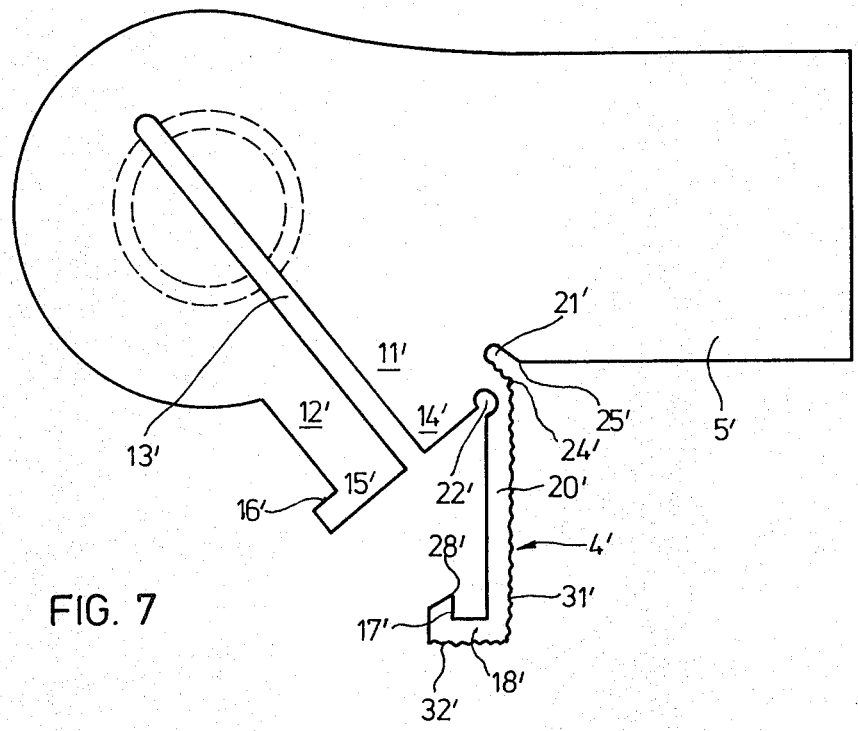
Figure 8:
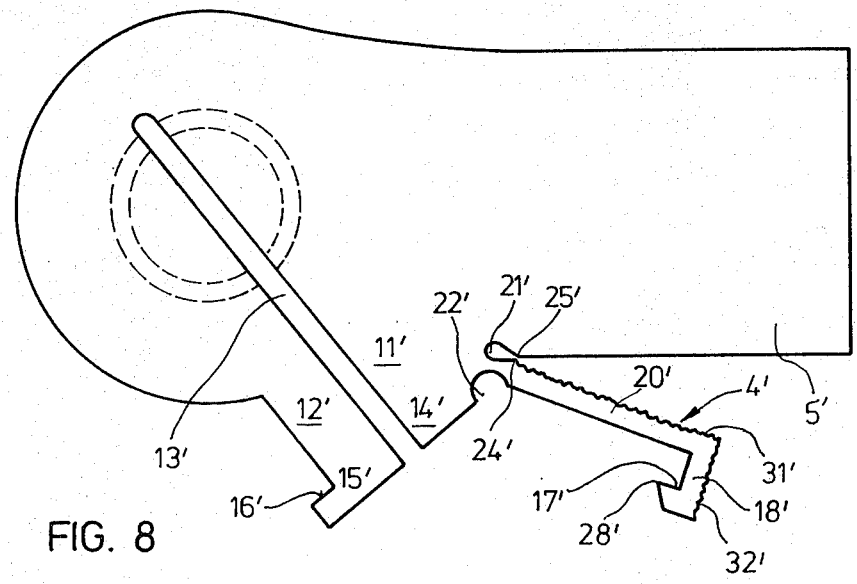

One embodiment of the invention is described with reference to the following figures:

FIG. 1 shows the ball socket with a handlebar screwed into the shaft and a ball end inserted into the ball socket, whereby the two leg end portions of the ball socket are connected with each other by means of the locking part, FIG. 2 is a top view on an enlarged scale of the ball socket illustrated in FIG. 1 without the handlebar and ball end, in which the locking part connects the two leg end portions with each other, FIG. 3 is a top view of the ball socket illustrated in FIG. 2 without the handlebar and ball end, showing the locking part in an open position, FIG. 4 shows the ball socket illustrated in FIG. 3, the locking part being in its maximum open position, FIG. 5 is a partial side elevational view similar to FIG. 1 but showing an additional embodiment thereof, FIG. 6 is a top view on an enlarged scale of the ball socket illustrated in FIG. 5 without the handlebar and ball end and showing the locking part in a locked position, FIG. 7 is a top view similar to FIG. 6 but showing the locking part in an initially opened position, and FIG. 8 is a top view similar to FIG. 7 but showing the locking part in a fully opened position.

Designated as 1 in FIG. 1 is the ball socket, formed with its hinged cover - like locking part 4 as one piece of extruded plastic. The entire one-piece ball socket is preferably extruded of a thermoplastic material. Locking part 4 is shown in a position connecting the two leg end portions 14 and 15 (FIG. 2) with each other. Ball socket 1 has a shaft 5 provided with a female thread 6 into which handlebar 7 is screwed. Inserted into ball socket 1 is ball head 8 which extends as thread bolt 9. Thread bolt 9 may, for example, be provided with collar 10 serving merely as a stop when bolt 9 is screwed into a female screw thread.

As is apparent particularly from FIG. 2, the two legs 11 and 12 are held together by locking part 4. The two legs 11 and 12 are separated from each other by a slot 13 extending on the one hand into shaft 5 and on the other hand separating leg end portions 14 and 15 from each other, said end portions developing respectively from legs 11 and 12.

As apparent from FIG. 2, the leg end portions 14 and 15 are constructed such that one leg end portion 15 has a ledge or a lip 16 on its outer side opposite slot 13 into which projection 17 of part 4 engages when the two leg end portions 14 and 15 are pressed against each other by locking part 4. Locking part 4 is thus constructed such that the inner surface of both side parts 18 and 19 and its yoke part 20 in this position are essentially flush with the respective outer surfaces of the two leg end portions 14 and 15. Side section 19 of locking part 4 is connected with leg end portion 14 via an elastic hinge strip 26 in the manner apparent from FIGS. 2 and 3. More precisely, the free end of side section 19 of locking part 4 is constructed such that it extends out of leg end portion 14. The hinge strip 24 connecting the end of side section 19 to leg end portion 14, thereby enabling bending of locking part 4 between the open position and a position holding leg end portions 14 and 15 together, is produced by providing recess 21 opened to the outside and recess 22 in leg end portion 14. Recess 22 is preferably constructed such that the inner surface of side section 19 abuts against the outer surface 23 of leg end portion 14 opposite slot 13 when locking part 4 is in a closed position. Recess 21 is constructed such that locking part 4 cannot be broken off when in an open position, as a result of incorrect handling. In order to prevent such breaking off, those edges of recess 21 leading to the outside form stop 24 with side section 19 of locking part 4 and form stop 25 with leg end portion 14. These two stops 24 and 25 prevent opening or turning locking part 4 in an open state to such an extent that damage or breakage of hinge strip 26 can occur. FIG. 4 illustrates that position of locking part 4 in which it was pivoted about the largest angle possible during opening and in which stops 24 and 25 abut on each other.

In order to bring locking part 4 quite readily into a position holding leg end portions 14 and 15 together, leg end portion 15 is provided with surface 27 between lip 16 and its free end, said surface slanted towards its free end, onto which surface end 28 of projection 17 of side section 18 glides when locking part 4 is brought into a position holding the two leg end portions 14 and 15 together. The inner surface of side section 18 of locking part 4 is preferably constructed such that it is flush with the slanted surface 27 of leg end portion 15 when locking part 4 is in the position of holding leg end portions 14 and 15 together.

The outer side of yoke part 20 is preferably provided with a ribbed surface 31 extending in a vertical direction transversely to the direction of movement of locking part 4, to permit moving locking part 4 more readily into a position in which it holds both leg end portions 14 and 15 together. To permit easy removal of locking part 4 from this position, the outer surface of side section 18 should be provided with ribbing 32 preferably at least in that area adjacent to yoke part 20 and extending in a direction vertical to the direction of movement of locking part 4.

The free end of side section 18 of locking part 4 is preferably constructed such that in the position in which locking part 4 holds the two leg end portions 14 and 15 together, an opening 30 exists between leg end portion 15 and the free end of side section 18 (FIG. 2). This opening 30 can be used in order to insert a tool to open locking part 4, said tool pressing side section 18 so far away from leg end portion 15 until projection 17 no longer grips lip 16.

In order to prevent dirt from reaching the ball socket, slot 13 is sealed at the spherical upper section of the ball socket by an elastic sealing membrane designed as part of said upper section. This sealing membrane is identified as 29 in FIG. 1.

FIGS. 5–8 illustrate a further embodiment of the invention.

The additional embodiment of the invention concerns a ball socket in which legs 11' and 12' do not represent an extension of shaft 5. Instead, legs 11' and 12' are arranged at an angle to shaft 5 of the ball socket. Those elements already described in connection with FIGS. 1–4 have identical reference numbers in FIGS. 5–8, each however is provided with an ' for better differentiation. FIG. 5 shows a side view of the further embodiment of the ball socket of the invention. As shown, membrane 29' covering slot 13' also extends at an angle to the longitudinal axis of shaft 5'. The embodiment of the ball socket of the invention as illustrated in FIG. 6 shows that locking part 4' is closed, pressing together legs 11' and 12' extending at an angle to shaft 5'. Locking part 4' is thereby constructed of one piece with the ball socket and as apparent from FIG. 6 develops laterally out of shaft 5' forming recesses 21' and 22' in the manner already described in connection with recesses 21 and 22. In a closed state, the inner surface of yoke part 20' is flush with leg end portions 14' and 15'. Leg end portion 15' has a lip 16' on its side opposite slot 13' which is engaged in a closed condition by projecting 17' of side section 18' of locking part 4'. In the manner already described, it is possible to provide ribbings 31' or 32' on the outer side of yoke part 20' and/or side section 18' of locking part 4', for better handling.

FIG. 7 shows the further embodiment of the invention in a condition in which the locking part 4' does not hold legs 11' and 12' clamped together. FIG. 8 shows the condition in which locking part 4' is opened to that extent at which stops 25' and 24' abut on each other in order to prevent that locking part 4' is opened so wide that the area of transition between shaft 5', or leg 11' and yoke part 20' is stressed in a damaging fashion.

An essential advantage of that form of the embodiment illustrated in FIGS. 5–7 consists in enabling greater traction to be exerted on the ball socket in relation to the longitudinal axis of shaft 5', due to the slanted arrangement of legs 11' and 12', such traction proceeding in approximate longitudinal direction of shaft 5'. Namely, such traction force does not proceed in the direction of slot 13' in the case of the additional embodiment of the invention.

A further advantage of the additional embodiment of the invention consistts in constructing locking part 4' such, due to the inclined arrangement of leg end portions 14' and 15' to shaft 5', that side section 19 of that embodiment shown in FIGS. 1-4 is not required. Instead, locking part 4' can be directly connected in one piece with the ball socket by means of that end of yoke part 20' which is opposite that end connected to side section 18'.

A further advantage of the additional embodiment consists in permitting a shorter dimension along the longitudinal axis of shaft 5' compared with the ball socket of FIGS. 1–4, because locking part 4' and legs 11' and 12' are not positioned in this longitudinal direction. This can be a particularly great advantage for applications of a ball socket where there is little room is the direction of handlebar 7'.

I claim:

1. A ball socket of plastic extruded in one piece for a ball and socket joint and having a shaft and a ball end, said joint having an axis which in a standard position is lateral to the shaft, in which the ball socket is divided by a slot extending into the area of its shaft, and in which a cover-shaped locking part is provided in the region of an open end of the slot to hold legs of the ball socket together, said part including two side sections and a yoke part connecting the two side sections with each other, in which one side section has a projection fitting over a lip arranged on the one leg when said locking part holds the two legs together, and in which a free end of the other side section is connected with the other leg via an elastic area forming a hinge strip, characterized by providing in the region of the hinge strip (26) at that side pointed away from slot (13) a recess (21) opening toward the outside, the edges (24, 25) of which leading outward and being a distance from each other to form stops limiting an aperture angle of locking part (4) starting from that position in which locking part (4) holds the two leg end positions (14, 15) together, and being further characterized by providing in an area of the hinge strip (26) at the side opposite the recess (21) a further recess (22) projecting into the other leg end portion (14), said additional recess bordering a surface (23) toward the end of the other leg end portion (14) with which surface the inner wall of the other side section (19) is flush when the locking part (4) holds the two leg end portions (14, 15) together.

2. The ball socket of claim 1, characterized by having the recess (21) and the additional recess (22) that shape the hinge strip (26) extend in the other leg end portion (14) toward the opening accepting ball end (8).

3. The ball socket of claim 1 or 2, characterized by constructing the one side section (18) of locking part (4) such that when locking part (4) holds the two leg end portions (14, 15) together, an opening (30) exists between the one leg end portion (14) and the other side section (18), in which opening a tool can be inserted to open the locking part (4).

4. The ball socket of claim 1 or 2, characterized by providing on the outermost side of the yoke part (20) of locking part (4) a ribbed surface (31) extending in a vertical direction transversely to the direction of movement of locking part (4).

5. The ball socket of claim 1 or 2, characterized by providing on the outermost side of the one side section (18) of locking part (4) at least in the region adjacent to the yoke part (20) a ribbed surface (32) extending in a vertical direction transversely to the direction of movement of locking part (4).

6. The ball socket of claim 1 or 2, characterized by providing the outermost side of one leg end portion (15) between its free end and lip (16) with a surface (27) inclined toward the free end of the one leg end portion (15), effecting the free end (28) of projection (17) to slide on the inclined surface (27) when closing locking part (4).

7. The ball socket of claim 6, characterized by having the inner wall of the one side section (18) inclined such within the region between the projection (17) and the inner wall of the yoke part (20) that it acts on the inclined surface (27) of the one leg end portion (15) when locking part (4) holds the two leg end portions (14, 15) together.

8. The ball socket of claim 1 or 2, characterized by covering the slot (13) with an elastic membrane (29) on its side facing away from the ball end (8).

9. The ball socket of claim 1 or 2, characterized by having the slot (13') and legs (11', 12') proceed at an angle to the longitudinal axis of the shaft (5').

10. The ball socket of claim 9, characterized by connecting the locking part (4') with the leg end portion (14') located closer to shaft (5') such that the one end of the yoke part (20') extends directly into this leg end portion (14') and the shaft (5') forming the recesses (21', 22') and the stops (24', 25').

* * * * *